G. T. REISS.
TOOL HOLDER.
APPLICATION FILED APR. 13, 1908.

920,998.

Patented May 11, 1909.

Witnesses:
Elmer R. Shipley.
M. S. Belden.

George T. Reiss
Inventor
by James W. See
Attorney

UNITED STATES PATENT OFFICE.

GEORGE T. REISS, OF HAMILTON, OHIO, ASSIGNOR TO NILES-BEMENT-POND COMPANY, OF JERSEY CITY, NEW JERSEY.

TOOL-HOLDER.

No. 920,998.  Specification of Letters Patent.  Patented May 11, 1909.

Application filed April 13, 1908. Serial No. 426,731.

*To all whom it may concern:*

Be it known that I, GEORGE T. REISS, a citizen of the United States, residing at Hamilton, Butler county, Ohio, have invented certain new and useful Improvements in Tool-Holders, of which the following is a specification.

This invention, relating to tool holders adapted for employment on machine tools, will be readily understood from the following description taken in connection with the accompanying drawing in which:—

Figures 1, 2:
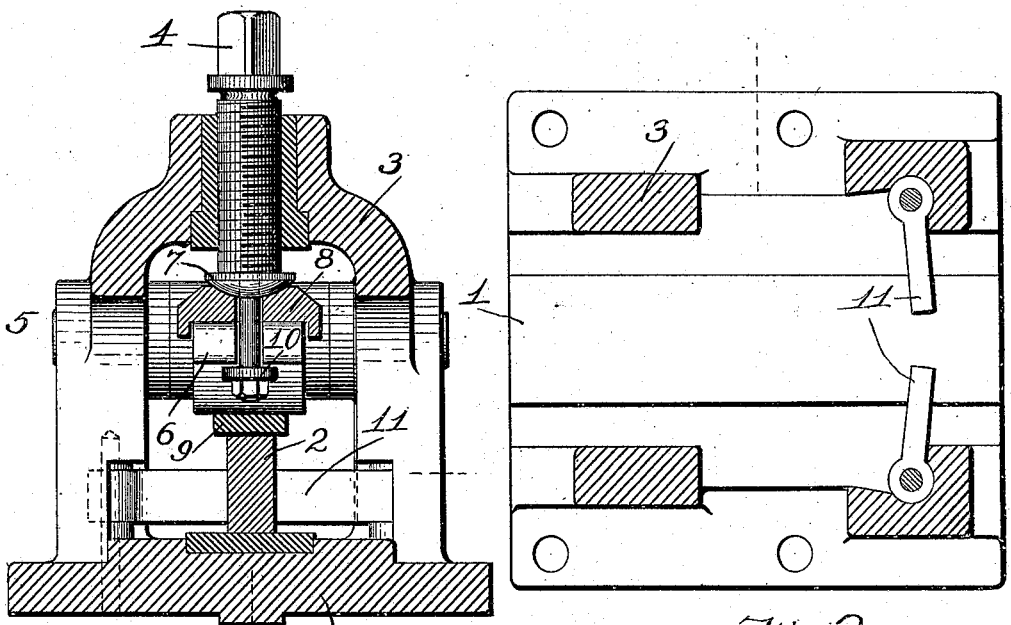
Figure 3:
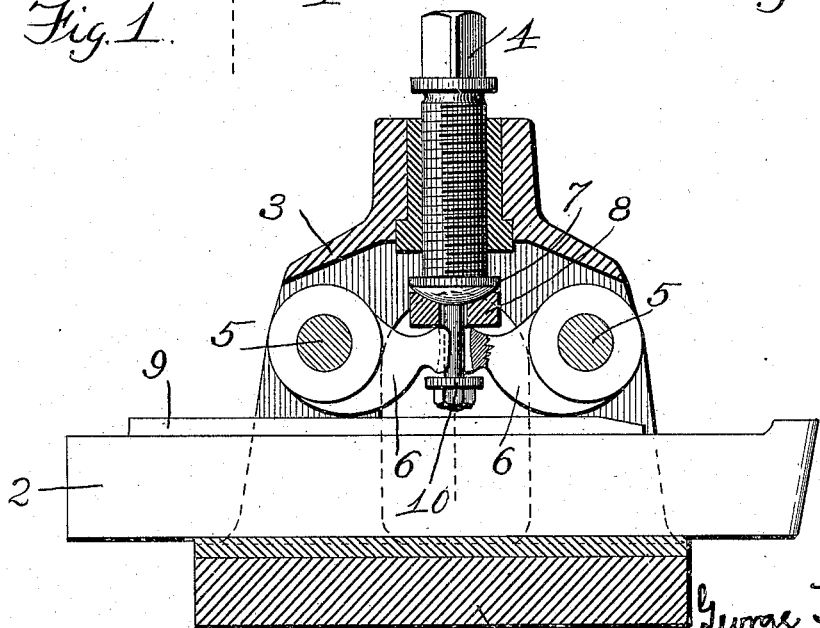

Figure 1 is a vertical transverse section of a tool holder exemplifying my invention: Fig. 2 a horizontal section of the same: and Fig. 3 a vertical longitudinal section of the same.

In the drawing:—1, indicates a base-piece suited for the support of a tool and adapted to be united with the tool-carrying member of a machine tool, the carriage of a lathe, for instance: 2, the tool resting thereon: 3, an arch extending from the base-piece up over the tool: 4, the clamping screw disposed vertically in the arch, which screw would, in ordinary cases, have its lower end impinging upon the tool or upon a shim on the top of the tool: 5, a pair of pivots disposed across the arch over and at right angles to the tool: 6, a lever mounted on each pivot, the ends of these two levers projecting inwardly to a point near each other and under the screw: 7, a downwardly presenting thrust-surface carried by this screw above the inner ends of the levers, this thrust-surface being preferably convex: 8, a washer loosely carried by the screw between the thrust-surface 7 and the inner ends of the levers, this washer being freely supported by the screw and having a concave upper surface engaging the convex thrust-surface of the screw: 9, a shim disposed between the tool and the levers: 10, a collar carried by the screw and adapted to engage below the inner ends of the levers: and 11, side-stops pivoted in the sides of the arch and adapted, when turned inwardly, to stay a narrow tool sidewise and adapted, when turned outwardly, to permit the presence of a wide tool in the tool holder or to permit of the ready withdrawal rearwardly of a wide tool having a narrow shank.

When the screw is run downward it forces the inner ends of the two levers down and causes the intermediate portions of the levers to powerfully grip the tool, and the possible rocking of the washer upon the convex thrust-surface of the screw permits of some degree of equalization of the pressure exerted by the individual levers in case of differential movement on their part. The collar 10 lifts upwardly upon the levers and releases the tool when the screw is run upwardly. In the case illustrated the levers are so short as to take on the form of cams, resulting in a very considerable gripping power applied at the two points on the tool and by means of a structure of marked compactness.

The clamping movement of the levers is small and slow and the shim 9 facilitates the ready removal of a tool having an elevated nose, it being necessary merely to relieve the clamping pressure sufficient to permit of the shim being withdrawn, whereupon the tool may be withdrawn rearwardly notwithstanding the elevation of its nose.

In the construction illustrated the tool, instead of resting directly upon the top of the base-piece, rests upon a shoe separately inserted therein, which feature of construction will be recognized as a mere expedient for providing the base-piece with a tool-bearing surface of specially desirable material and of renewable character.

I claim:—

1. A tool holder comprising, a base-piece adapted for the support of a tool, a top-member carried thereby above the tool, a screw engaging the top-member and having a thrust-surface presenting toward the base-piece, a pair of pivots disposed parallel with each other across the top member and over the tool and on opposite sides of the axis of the screw, and levers mounted on said pivots and having intermediate portions adapted for clamping effect upon the tool and having their ends projecting inwardly under the thrust-surface of the screw, combined substantially as set forth.

2. A tool holder comprising, a base-piece adapted for the support of a tool, a top-member carried thereby above the tool, a screw engaging the top-member and having a convex thrust-surface presenting toward the base-piece, a pair of pivots disposed parallel with each other across the top-member and over the tool and on opposite sides of the axis of the screw, levers mounted on said pivots and having intermediate portions adapted for clamping effect upon the tool and having their ends projecting inwardly under the thrust-surface of the screw, and a collar loosely carried by said screw and engaging over the inner ends of said levers and having a concave upper surface engaging the convex-thrust-surface of the screw, combined substantially as set forth.

3. A tool holder comprising, a base-piece adapted for the support of a tool, a top-member carried thereby above the tool, a screw engaging the top-member and having a thrust-surface presenting toward the base-piece, a pair of pivots disposed parallel with each other across the top-member and over the tool and on opposite sides of the axis of the screw, levers mounted on said pivots and having intermediate portions adapted for clamping effect upon the tool and having their ends projecting inwardly under the thrust-surface of the screw, and a collar carried by said screw and adapted for upward engagement with the inner ends of said levers, combined substantially as set forth.

4. A tool holder comprising, a base-piece adapted for the support of a tool, a top-member carried thereby above the tool, a pair of pivots disposed parallel with each other across the top-member and over the tool, inwardly projecting levers mounted on said pivots and having intermediate portions adapted for clamping effect upon the tool, and a pressure-producing device carried by said top-member and adapted for downward action upon the ends of said levers, combined substantially as set forth.

5. The combination of a frame, a tool therein, two levers separately pivoted in the frame and adapted to clamp the tool and a screw adapted to act upon both levers and serving to urge them to clamping position.

6. The combination of a frame, a tool therein, two levers separately pivoted in the frame and adapted to clamp the tool, a screw adapted to act upon both levers and serving to urge them to clamping position, and a member carried by the screw and adapted for upward engagement of the levers, to support and retract them when the screw is reversely rotated.

7. The combination of a frame, a tool therein, two levers separately pivoted in the frame and having faces adapted to clamp the tool, an equalizer engaging the levers and a screw mounted in the frame and engaging the equalizer.

GEORGE T. REISS.

Witnesses:
 ROBERT B. MILLIKIN,
 M. S. BELDEN.